United States Patent Office 3,024,124
Patented Mar. 6, 1962

3,024,124
STABILIZING SALTS FOR MULTICOLOR LACQUERS
Keith Nelson, Marietta, Ohio, assignor, by mesne assignments, to Martin-Marietta Corporation, Chicago, Ill., a corporation of Maryland
No Drawing. Filed Nov. 29, 1957, Ser. No. 699,492
6 Claims. (Cl. 106—170)

The present invention relates to pebble lacquers and more particularly to coating compositions in which complete coating materials are dispersed in the form of relatively large particles or globules, the majority of which are larger than 50 microns in size, dispersed in an aqueous dispersing medium containing an organic colloidal suspension stabilizer. The dispersion of the complete coating material in the aqueous medium is one in which the coating material such as a paint lacquer, varnish or enamel provides globules which are suspended in the presence of an organic colloidal suspension stabilizer in said aqueous medium to provide globules which are substantially immiscible with said medium. The suspended globules may be of the same color or shade or they may be of different colors, in which case there are provided coating compositions of the multicolor type.

It has been generally recognized that pebble lacquers, enamels and paints, including the multicolor type, possess limited shelf life. On standing for 24 hours or longer, the particles tend to settle out of suspension after first coalescing to form larger droplets which form a gel at the bottom of the container holding the coating composition. Once the particles have gelled to any substantial extent, they cannot be re-suspended by mere agitation. Hence it has been necessary to prepare the suspension of coating material shortly prior to utilizing the material as a coating applied to a base. After the lapse of several weeks in storage the suspension of the coating material deteriorates so greatly as to become unusable.

The present invention is directed to the incorporation of a gelling retarding material consisting of a water-soluble, non-oxidizing, inert inorganic salt of a strong acid and a base into the aqueous suspending phase of a pebble lacquer dispersion containing an organic colloidal suspension stabilizer, said salt being dissolved in the aqueous suspending phase in an amount of at least 0.3% and preferably at least about 0.7%, but not more than about 12% by weight thereof, whereby effective retardation of gelling of the large coating particles is achieved for storage periods of about 60 days and longer without impairing the coating characteristics of the coating dispersion.

It has been discovered that the unpredictable instability inherent in the manufacture and storage of multicolor type lacquers may be overcome by the incorporation of from about 0.3% by weight of the aqueous dispersing medium of a water-soluble, non-toxic salt of an acid from the group consisting of sulfuric acid and hydrochloric acid with a base. As a result of such incorporation, instability resulting in lumpiness, thickening and gelling of the lacquer which appears shortly after manufacture and up to several weeks in storage may be substantially eliminated.

It is essential that the salt of sulfuric acid or hydrochloric acid in the above minimum proportion be completely dissolved in the water phase containing the colloidal organic stabilizer prior to the addition of the lacquer phase. Surprisingly, the presence of the water-soluble salt dissolved in the free water phase permits greater freedom of mixing and there is obviated the danger of premature precipitation of the dispersion through overagitation either for too long a period of time or at too high a speed.

The addition of water-soluble salts in the above minimum concentration and in completely dissolved condition permits large as well as small lacquer particles of coating material to be suspended in stabilized form in the pebble lacquer and permits greater variation of speed of agitation and of the selection of resinous coating material. Even where slight settling may occur, there is an advantage of easier redispersion of lacquer particles to their former condition with a minimum of shaking or stirring if the compositions are stabilized in accordance with the invention.

In view of the requirements that the gel-retarding salt be present in dissolved form in the aqueous medium in an amount of at least about 0.3% by weight based on the weight of the aqueous phase of the pebble lacquer and that the salt be completely dissolved in the aqueous phase, the maximum proportion of salt which may be present in the aqueous phase is limited by the maximum proportion of salt which can be completely dissolved. Thus, calcium sulfate which is only sparingly soluble cannot be employed beyond the minimum proportion of about 0.3% at which concentration it is not completely soluble. Calcium sulphate is thus substantially inoperative.

Preferably, at least about 0.7% of the salt is dissolved in the aqueous medium to provide more effective protection against gelling. The preferred maximum proportion of salt in the aqueous medium is about 12% by weight based on the weight of the aqueous phase.

In selecting the salt to be employed and the proportion thereof, it is essential that the salt must remain in solution in the aqueous medium and not form a colloid in the aqueous phase of the pebble lacquer. Otherwise, stabilization is not achieved.

It is further essential that the salt be insoluble in the dispersed organic particles of the coating composition. In this regard, the coating compositions may be varied considerably as to film-forming agent, pigment, vehicle, extender, etc. While aluminum sulfate is invariably insoluble in these diverse organic coatings and while various other salts of the invention, e.g., sulfates and chlorides, are generally insoluble in the various organic coatings which may be employed, there are instances in which specific salts become partially soluble in pigmented coatings. It is necessary that these occasional specific pigmented coatings in which the salt is partially soluble in the coating be avoided.

It is still further essential that the dissolved salt resist hydrolysis under the conditions to which the aqueous dispersing medium is subjected so that the formation of a colloid is avoided. The formation of a colloid from the salt dissolved in the water phase under the conditions present is detrimental to stabilization. Also salts which tend to hydrolyze in the water medium having a neutral to slightly acid pH, may alter the pH of the medium which may be further detrimental to stability.

Although prior pebble lacquer systems have been stabilized using an inorganic colloidal material as the dispersing agent in the aqueous phase, the present invention is not applicable to such systems. Regardless of the explanation which may be posed, it it observed with inorganic stabilizers that the dispersed particles of coating materials coalesce and drop out of suspension on prolonged standing. Surprisingly, this same effect does not occur when the dispersing or stabilizing agent is an organic colloidal material and particularly methyl cellulose.

The organic colloidal suspension stabilizer for the suspended large coating particles is a necessary ingredient of the pebble lacquer and other coating dispersion compositions to which the gel-retarding agent is added in accordance with the invention.

It has been found that the suspension stabilizer to which the gel-retarding agent of the invention is added cannot be an inorganic colloidal suspension stabilizer, for example, calcium sulfate or fuller's earth, since effective retardation of gelling on storage is not thereby attained.

The gel-retarding action during long storage of the water-soluble inert non-oxidizing inorganic salt of a strong acid and a base dissolved in the aqueous suspension medium in the presence of the organic suspending colloid may be achieved with any organic colloidal stabilizer such as gum tragacanth, gum arabic, dextrin, starch, polyvinyl alcohol and methyl cellulose. Methyl cellulose is of outstanding effectiveness as the organic colloidal suspending agent and is therefore preferred in compositions modified in accordance with the invention to achieve greater storage stability of the dispersion coating composition.

The inert salt which is added to the aqueous phase of a wide variety of pebble lacquers, in accordance with the invention, must not adversely affect the properties of the pebble lacquer in application, e.g., gloss, sprayability, flow, adhesion, hardness and elesticity.

Referring more particularly to the lack of shelf life of pebble lacquers as they are presently available, it is desired to point out that the stability of present-day pebble lacquers is an unpredictable factor. Instability may become apparent in as little as 24 hours, or it may appear only after one to several weeks in the package. Batches may grow lumpy, thicken, or may even form a solid gel. These reactions are generally non-reversible. As will be obvious, these effects are detrimental to the packaged product, represent a serious loss in time and raw material, and lead to many complaints by customers.

Attemps have been made to explain the lack of adequate shelf stability of the pebble lacquers presently available. However, it has not been possible to assign any specific cause as underlying the general tendency of most present-day pebble lacquers to be unstable upon storage. In some instances it has been demonstrated that specific pigments, or vehicles, or resins, or combinations thereof, produce the varying degrees of instability. Frequently, no precise reason can be assigned to explain why one lot might be reasonably suitable while a similar lot is not.

The present invention eliminates the uncertainty and unreliability which appear to be inherent in the present-day process.

It is desired to stress that the selection of the inert salts of strong acids for inclusion in the aqueous phase in accordance with the invention to produce a gel-retarding action is a critical matter. The water-soluble inorganic salts must be of a strong non-oxidizing acid, such as hydrochloric acid, or sulfuric acid. Replacement of these salts with acids is inoperative in accordance with the invention. Likewise, replacement with basic substances is also inoperative. Moreover, salts of weakly acidic ions as well as salts of oxidizing acids are wholly unsuited for the purpose of the invention. Thus, generally, the use of acids, bases, salts of weak acids and salts of oxidizing acids is detrimental and provides, on frequent occasion, a shortening of the time before gelling rather than the substantial lengthening of time before gelling sets in such as is achieved in accordance with the invention.

Such acids as phosphoric acid for example are not sufficiently strong to provide a salt which will hydrolyze to a neutral or acid pH in the aqueous phase of the dispersion. Thus trisodium phosphate tends to increase the pH above 7.2–7.5 and instead of retarding gelling, promotes gelling of the suspended large organic coating particles.

The gel-retarding salt may not be of an oxidizing acid such as nitric acid, chloric acid, perchloric acid, manganic acid, permanganic acid, etc., since these acids tend to cause deterioration by oxidation of the resin component, such as nitrocellulose as well as the oxidizable pigment component of the lacquer phase.

The gel-retarding salt may not be chemically reactive in other ways with the pigment, resin, oil, plasticizer or solvent, components of the lacquer phase, since such chemical reactivity destroys the dispersion coating and causes gelling rather than retarding the same. For example, soluble sulfide salts sufficiently reactive to darken the pigment are unsuitable. Soluble iodide or bromide salts which tend to liberate iodine or bromine to react with the lacquer components are unsuitable. Molybdedenum, tungsten, vanadium, cobalt and bismuth salts which cause deterioration, aging or catalytic oxidation of the resin and oil components in the lacquer phase are unsuitable.

A primary factor which is believed to be responsible for the new gel-retarding result is the observation that the addition of inert salt of a strong acid and base to the aqueous phase tends to retard the entry of water-miscible and water-soluble components from the dispersed coating particles into the water phase. The water-miscible and water-soluble components of the dispersed coating particles, e.g., the lacquer solvents, are less soluble in the aqueous phase when this aqueous phase contains a substantial proportion of aluminum sulphate. While the lacquer or resin solvents have been mentioned constituting one type of the water-miscible or soluble factors, there may also be present other water-soluble types of impurities, such as fractions of resin, pigment components, filler components, etc., in the dispersed coating particles and the use of aluminum sulphate appears to function to prevent these materials from entering the aqueous phase.

The presence of a strong electrolyte in the aqueous phase which is chemically inert to the coating material limits the tendency of organic colloidal material present in the lacquer phase to leach into the aqueous phase. Ions may be absorbed on the particles of organic colloidal matter in the aqueous phase, e.g., the particles of methyl cellulose. The new result which has been achieved can perhaps be partially explained by the fact that the colloidal stabilizing particles are protected from uniting with any positively charged organic colloidal material which may leach from the dispersed coating particles.

In the prior art pebble lacquers, the aqueous phase may be prepared using tap water or distilled water, the traces of various salts which are in solution in the tap water being tolerated. Tap water contains traces of many dissolved salts, these salts being normally present in at most a few hundred parts per million. The present invention is distinguished from this small amount of electrolyte which may be incidentally present in tap water and requires that the solute be critically selected and used in proportions many times greater than the salt content in ordinary tap water.

Despite the fact that other salts in the limited effective class possess a gel-retarding action, aluminum sulphate is unique and unexpectedly is universally and outstandingly effective within pebble lacquer systems as defined herein, whereas the salts of the invention are less effective as set out in detail below.

Among the many coating materials which can be used in the dispersed phase are nitrocellulose, cellulose acetate and ethyl cellulose lacquers, various synthetic and natural resin enamels, oil base paints made with drying or non-drying oils, solutions of polymerized synthetic resins such as the polyvinyls, the styrenes, polyacrylic resins, urea-formaldehyde resins, enamels, paints and the like, etc.

Preferably, such coating materials include all of the necessary constituents of a coating material, such as a bodying agent, coloring matter and one or more organic solvents. Other materials such as driers, hardening agents, non-volatile plasticizing agents and others may also be included if necessary or desired.

At the present time, the production of pebble lacquers requires that the coating materials do not contain a high proportion of water-soluble solids and/or water-miscible solvents.

In accordance with the present invention, a greater proportion of water-soluble solids and/or water miscible solvents may be included in the dispersed or lacquer phase. This is because the water phase has been modified by the inclusion of a substantial proportion of inorganic salt and the water-soluble solids and water-miscible solvents are considerably less soluble and/or miscible with the aqueous phase of the invention in which an inorganic salt has been dissolved.

The provision of a pebble lacquer containing inert inorganic salt in the aqueous phase requires that materials be admixed in proper order. Specifically, it is necessary that the inorganic salt in powder form be prevented from directly contacting the organic colloidal material because the particles of salt become coated with the colloidal material which tends to greatly retard the solution of the inert inorganic salt in the aqueous phase.

A further point of criticality is the fact that the inert inorganic salt should not be placed in the lacquer phase. When inert inorganic salt is incorporated in the lacquer, the gel-retarding influence of the inorganic salt is usually nullified and in some cases the effective shelf life of the resulting pebble lacquer is substantially impaired.

The invention is illustrated by the following specific example in which a pebble lacquer containing aluminum sulphate in the aqueous phase is prepared by dissolving the aluminum sulphate in water and then adding the solution of aluminum sulphate to the solution of the organic stabilizing colloid.

EXAMPLE I.—ANALYSIS OF A TYPICAL WHITE PEBBLE LACQUER

Lacquer phase (72%):

Solids (25% of lacquer phase)— Percent
  Titanium dioxide rutile_____ 38.40
  Nitrocellulose, 5-6 sec_____ 29.20
  Dioctyl phthalate_____ 5.50
  Non-drying alkyd resin_____ 26.90
                                        ——
                                       100.00

Volatile (75% of lacquer phase)—
  Xylene _____ 49.43
  n-Butyl alcohol_____ 13.00
  Methyl amyl acetate_____ 37.57
                                        ——
                                       100.00

The non-drying alkyd resin used in Example I is a coconut oil alkyd resin having an oil content of 48% and a phthalic anhydride content of 34% with an acid number of 7 to 10. The viscosity of the alkyd resin in a xylol solution containing 60% resin solids, is D to F on the Gardner-Holdt scale at 25° C.

Other oil modified alkyd resins may be used in place of the modified alkyd specified above. For example, the oil may be castor oil, cottonseed oil, rape seed oil, soya oil, or any other non-drying oil. Semi-drying oil or drying oils, as are known, may also be used, such as dehydrated castor oil or linseed oil, but these are not preferred because of their color and tendency to yellow with age after application.

Instead of nitrocellulose in this example, a plasticized mixture of nitrocellulose and ethyl cellulose may be used. Ethyl cellulose may constitute 30 to 70% of the mixture. Preferred plasticizers for this mixture are set forth in Example V. The ethyl cellulose used is preferably an ethoxyl substituted product of the "G" or "K" types where the per cent of ethoxyl runs from 44.5 to 45.5 in the "G" type having a viscosity of 40 to 52 cp., and from 45.5 to 46.8 percent ethoxyl in the "K" type having a viscosity of 12 to 16 cp. The "N" type ethyl cellulose can also be used in the lower viscosity range and having a percent ethoxyl from 47.5 to 49% and a viscosity of 12 to 16 cp. The corresponding product having a viscosity of 18 to 24 cp. may also be used. The "N" type of ethyl cellulose produces an excellent coating. The type "G" ethyl cellulose products can be used to advantage when modified with an alkyd resin.

Water phase (28%): Percent
  Tap water_____ 98.80
  Methyl cellulose_____ 0.40
  Tributyl phosphate_____ 0.10
  Aluminum sulphate_____ 0.70
                                        ——
                                       100.00

The aluminum sulphate in the form of crystals of $Al_2(SO_4)3.18H_2O$ is held out and added as a 10% solution in tap water, to the water-phase at the time of manufacture of the pebble lacquer.

Different colors are obtained by either tinting the white lacquer phase with the desired pigment color pastes for pastel shades, or by replacing part of the titanium dioxide with color pigment.

Typical pigment colors used are: phthalocyanine greens and blues, iron blues, chrome greens, chrome yellows, molybdate oranges, Watchung organic red, red or yellow or brown iron oxides, and lampblack.

A typical white pebble lacquer is produced as follows:

Methocel-water stock solution_____gal__ 173.00
Tap water_____gal__ 43.00
Tributyl phosphate_____gal__ 0.10
Aluminum sulphate (hydrated.18H₂O)_____lbs__ 11.68
White lacquer base_____gal__ 487.00

Procedure: Place methocel stock solution in mixing tank. Dissolve the aluminum sulphate in 10 to 15 gallons of the tap water (more water gives speedier solution). Add this solution, plus the balance of tap water, to the tank. Add tributyl phosphate to tank and agitate tank contents moderately for approximately 5 minutes. Add the white lacquer base to tank, all at once, and agitate tank contents moderately until desired particle size is attained.

In the above Example I there was used in place of 0.70 weight percent of aluminum sulphate in the water phase a corresponding weight of each of the following specific sulphates and chlorides. In each instance the pebble lacquer was effectively stabilized to provide a shelf life of the pebble lacquer produced which contained inorganic salt in the water phase in that the lacquer could be stored for 90 days and was still usable at the termination of this storage period.

The salts which were successfully employed are as follows: aluminum sulphate, aluminum chloride, aluminum potassium sulphate, aluminum ammonium sulphate, ammonium sulphate, sodium sulphate, sodium chloride, potassium sulphate, lithium sulphate, calcium chloride, chromium sulphate, ferrous sulphate, manganous sulphate, nickel chloride, magnesium sulphate, and tin sulphate.

In Table I below, there is illustrated the results of a large number of tests to determine the stabilizing action of the various gel-retarding salts of the invention, these tests being performed with various modifications of the lacquer composition of Example I. It should be appreciated, in view of the large number of salts which have been found to be effective, that every salt could not be tested with every lacquer modification and, accordingly, only a reasonable number of tests were made in order to demonstrate that all of the salts were operative despite significant variation in pigment, resin, solvent or plasticizer.

In Table I presented below, the numbers in each of the columns designate specific materials which were used, these materials being listed following the table.

Table I
ILLUSTRATIVE SUCCESSFUL MODIFICATION OF EXAMPLE I PRODUCING STABLE GEL-RETARDED PEBBLE LACQUER

| Salt [1] | Pigment [2] | Resin [3] | Solvent [4] | Plasticizer [5] |
|---|---|---|---|---|
| Aluminum chloride | 1, 3, 8, 9 | 1, 2, 3, 6 | | 2 |
| Aluminum potassium sulphate | 1, 2, 6, 7, 8, 9 | 1, 4, 5 | 1 | 1 |
| Aluminum ammonium sulphate | 1, 2, 3, 4, 8 | 1, 3, 4, 6, 7, 8 | 1 | |
| Ammonium sulphate | 1, 2, 3, 6, 8 | 1, 2 | 4 | |
| Sodium sulphate | 1, 4, 5, 8 | 1, 4 | 2 | 2 |
| Sodium chloride | 1, 2, 3, 4, 6 | 1, 2, 3 | | |
| Potassium sulphate | 2, 6, 8 | 3, 7 | 1, 4 | 1 |
| Lithium sulphate | 5, 8 | 1 | 2 | |
| Calcium chloride | 1, 2, 3 | | | 1 |
| Chromium sulphate | 1, 3, 6, 9 | | 1 | |
| Ferrous sulphate | 1, 2, 7, 9 | 3, 8 | 3 | 2 |
| Manganous sulphate | 1, 2 | 8 | | |
| Nickel chloride | 1 | 3, 8 | | |
| Magnesium sulphate | 1, 7, 8 | | | |
| Tin sulphate | 8 | | | |

[1] Each of the salts was employed in an amount of 0.7% by weight based on the weight of the aqueous phase in place of the aluminum sulphate of Example I.
[2] The pigments listed were employed to replace on a weight-for-weight basis the titanium dioxide rutile of Example I.
[3] The resins listed were employed to replace on a weight-for-weight basis the non-drying, long oil, alkyd resin of Example I.
[4] Each of the solvents listed was employed to replace the methyl amyl acetate component of Example I on a weight-for-weight basis.
[5] Each of the plasticizers listed was employed to replace on a weight-for-weight basis of dioctyl phthalate employed in Example I.

The pigments, resins, solvents and plasticizers used in Table I and which are identified by number therein, are listed below.

PIGMENT
(1) Titanium dioxide, anatase.
(2) 50% titanium dioxide rutile; 50% blanc fixe (barium sulfate).
(3) 50% titanium dioxide rutile; 50% china clay.
(4) 50% titanium dioxide rutile; 50% Nytal 400 talc (magnesium silicate).
(5) 50% titanium dioxide rutile; 50% Superflos (diatomaceous silica).
(6) 50% titanium dioxide rutile; 50% precipitated calcium carbonate.
(7) 50% titanium dioxide rutile; 50% chrome yellow (lead chromate).
(8) 50% titanium dioxide rutile; 50% molybdated lead chromate.
(9) 50% titanium dioxide rutile; 50% brown iron oxide.

RESIN
(1) Short oil non-drying alkyd i.e., coconut oil alkyd of 33% oil content.
(2) Short oil drying alkyd i.e., dehydrated linseed oil alkyd of about 38% oil content.
(3) 50% hard maleic resin; 50% kettle-bodied castor oil.
(4) 50% hard maleic resin; 50% blown soybean oil.
(5) 90% medium oil non-drying alkyd; 10% Arochlor 1262.
(6) Amerlac 81 (short oil maleic-modified drying alkyd).
(7) 90% short oil drying alkyd; 10% dibutyl phthalate.
(8) 70% ester gum; 30% kettle-bodied castor oil.

SOLVENT
(1) n-Butyl acetate.
(2) Propyl acetate.
(3) Methyl isobutyl ketone.
(4) Ethyl alcohol denatured 50%; methyl amyl acetate 50%.

PLASTICIZER
(1) Tricresyl phosphate.
(2) Kettle-bodied castor oil.

All of the salts listed in Table I provided an effective gel-retarding action when used in Example I. Also, the aluminum sulphate of Example I provided an effective gel-retarding action when employed in each of the modifications of Example I indicated in Table I and the list of modifications following said table.

EXAMPLE II.—SYNTHETIC ENAMEL 100 parts of tap water containing 0.50 part of methyl cellulose was placed in a mixing kettle and 100 parts of a white enamel was slowly added while an agitator was operating at a speed of 400 r.p.m. The enamel had the following composition:

| | Parts by weight |
|---|---|
| Titanium dioxide rutile | 28 |
| Bettle resin; butylated urea-formaldehyde containing 50% resin solids, 30% butanol and 20% xylol; viscosity X to Z on the Gardner-Holdt scale at 25° C.; weight per gallon, 8.3 pounds | 36 |
| Short oil oxidizing alkyd resin of the soya bean type: 33% oil modification and 41% phthalic anhydride content; 55% resin solids in xylol and had an acid number of 6 to 12: viscosity $Z_2$-$Z_5$ on the Gardner-Holdt scale at 25° C | 36 |
| Total | 100 |

A commercially available resin which can be used as the alkyd resin is short oil oxidizing alkyd.

The agitator was stopped about 5 minutes after the addition of enamel had terminated and the dispersion was then ready for direct application as a coating composition. After 60 days on the shelf, the dispersion had settled and gelled and was unusable. The same composition including 0.7 part of aluminum chloride in the tap water could not be distinguished from the above composition on a freshly prepared basis. After 60 days the aluminum chloride-containing enamel had not gelled and could be used effectively after simple mixing.

EXAMPLE III.—OIL BASE PAINTS

A dispersion was formed by the procedure of Example II, using 50 parts by weight of a tap water solution containing 0.5 part of aluminum potassium sulphate in solution and 1.0 part of acid precipitated casein. 100 parts by weight of an oil paint of the following composition was dispersed in the aqueous medium.

| | Parts by weight |
|---|---|
| Chrome yellow pigment | 18 |
| Linseed oil | 4 |
| Oxidized sardine oil (Saybolt viscosity of 100 at 210° F.) | 67 |
| Mineral spirits | 10 |
| 6% cobalt drier solution | 0.5 |
| 24% lead drier solution | 0.5 |
| Total | 100 |

The dispersion so produced was well adapted for the production of coatings having high gloss. After 60 days on the shelf, the dispersion had settled. However, the settled dispersion was easily reconstituted by simple stirring and the storage time did not substantially affect the utility of the dispersion. The same composition in the absence of the aluminum potassium sulphate was essentially useless after 60 days' storage time.

EXAMPLE IV.—VINYL ACETATE LACQUER

Tap water containing 0.8% by weight gum tragacanth and 1.5% by weight aluminum ammonium sulphate in solution was prepared and 50 parts by weight of this solution placed in a mixing kettle. To this was added with mild agitation, 100 parts by weight of a lacquer having the following composition:

| | Parts by weight |
|---|---|
| Titanium dioxide | 12 |
| Vinyl acetate polymer | 31 |
| Toluol | 43 |
| Isooctyl acetate | 14 |
| Total | 100 |

The dispersion which was obtained was coarse and was suitable for application as a coating composition. The dispersion including the aluminum ammonium sulphate was substantially more stable than the same composition in which the aluminum ammonium sulphate was omitted.

EXAMPLE V.—ETHYL CELLULOSE LACQUER

An aqueous solution was formed by dissolving 0.5 part by weight of dextrine, and 0.5 part of gum tragacanth and 0.6 part of ammonium sulphate in 49 parts by weight of tap water, the tap water being split in two portions and the ammonium sulphate dissolved in one portion and the colloidal matter dispersed in the other. The two portions of tap water were then combined, placed in a kettle and agitated while 100 parts of a green lacquer of the following composition was added:

| | Parts by weight |
|---|---|
| Chrome green pigment | 12 |
| Ethyl cellulose | 15 |
| Ester gum | 15 |
| Castor oil | 4 |
| Dibutyl phthalate | 5 |
| Butyl alcohol | 7 |
| Xylol | 12 |
| Toluol | 30 |
| Total | 100 |

A sprayable dispersion was obtained having satisfactory shelf life. In the absence of ammonium sulphate, the corresponding lacquer had only limited shelf life and could not be relied upon to avoid gelling for more than a week or two.

In the above example, the consistency of the dispersed coating material in the aqueous dispersing medium may be controlled by the addition of appropriate amounts of suitable plasticizers which may be of the chemical type such as the compatible ester plasticizers, dibutyl phthalate, tricresyl phosphate, diphenyl phosphate, trioctyl phosphate, butoxy ethyl stearate, mixtures of these, etc. A resinous plasticizer may also be used such as a medium molecular weight polyester of sebacic acid and ethylene glycol having an acid number less than 20. These resinous plasticizers are also available commercially in a form in which the polyhydric alcohol is diethylene glycol or glycerol or polymeric glycol and in which part of the sebacic acid may be replaced by phthalic acid anhydride.

The advantage of incorporating from 20 to 40% of these plasticizers by weight of the dispersed phase is improved control of bodying of the coating material. A wide latitude of bodying can be achieved without causing the bodied coating material to exhibit a strong gelling and precipitating tendency. In the absence of gel-retarded salts of the invention, highly plasticized formulations containing cellulose derivatives as an important constituent thereof possess short and unpredictable shelf life.

EXAMPLE VI.—POLYSTYRENE DISPERSION 50 parts by weight of tap water containing 1.5% by weight of methyl cellulose and 5% by weight of dissolved sodium sulphate was placed in a mixing kettle and agitated with a rotary stirrer at 650 r.p.m. 100 parts of coating material was then added and agitation continued for 5 minutes.

| | Parts by weight |
|---|---|
| Chrome yellow pigment | 25 |
| Polystyrene resin (mol. wt. about 50,000) | 25 |
| Xylol | 50 |
| Total | 100 |

The resulting dispersion was sprayable and possessed good shelf life. In the absence of sodium sulphate, the dispersion gelled quickly and was unusable after a few weeks.

EXAMPLE VII.—MULTICOLOR OIL PAINT

Example III was first repeated by replacing the chrome yellow pigment with an equal weight of titanium dioxide, rutile. Equal parts of the white paint so produced and the yellow paint of Example III were mixed by simple stirring to produce a readily sprayable mixture in which the separate particles of each color retained their original identity without appreciable blending.

The body of each separately colored dispersed particle of coating material may be separately controlled by the addition of appropriate amounts of long oil alkyd resins such as a linseed oil modified alkyd resin produced from phthalic acid anhydride and glycerol having an acid number of about 4–12, a minimum phthalic acid anhydride content of 27 to 35% by weight and a minimum oil acid of 46 to 56% by weight.

Dehydrated caster oil, tung oil, sardine oil, soya bean oil and other oils may be used in place of linseed oil. The above alkyd resin may be dissolved in admixture with these oils. The oils may be blown or heat bodied to increase their viscosity.

In the absence of the gel-retarding salt of the invention, the oil paints of the type here described possess poor shelf life whereas the use of sodium chloride remarkably improves the shelf life of a wide range of bodied oil paints.

EXAMPLE VIII.—PHENOLIC RESIN PEBBLE LACQUER

A tap water solution containing 1% by weight of methyl cellulose and 1% by weight of potassium sulphate was produced and 50 parts of this solution was placed in a mixing kettle and 100 parts of the following mixture was added thereto while agitating at the rate of 450 r.p.m.

| | Parts by weight |
|---|---|
| Resin solution (67% phenol formaldehyde resin, 13% mineral spirit and 20% butanol) | 80 |
| Chrome yellow pigment | 20 |
| Total | 100 |

The resulting dispersion had good shelf life although in the absence of the gel-retarded salt, the dispersion gelled badly within a few days.

Very desirable finishes are produced by the gel-retarded and shelf-stabilized dispersion coating composition of the present invention. The individual particles of coating composition applied to the base lie randomly and may, at times, overlap or abut to provide a roughened surface of pleasing appearance. This appearance is enhanced when the particles of coating composition are of different colors. These compositions are particularly valuable when applied to porous and absorbent surfaces. In this instance, the invention permits employment of water-soluble and/or water-miscible components to thicken the rapid drying coating materials to provide new lacquer compositions which could not be made heretofore. The invention therefore provides improved gel-retarded pebble lacquers corresponding to present-day known compositions and also provides new pebble lacquers having improved properties which are especially valuable when the lacquers are applied to porous and absorbent surfaces.

I claim:
1. A decorative coating composition stable in liquid form consisting essentially of a dispersion of discrete particles, a major portion of which have a diameter greater than 50 microns, of organic film forming vehicle containing coloring matter in an aqueous dispersing medium containing an organic colloidal stabilizer and having dissolved therein approximately 0.3% to about 12% by weight, based on the weight of the aqueous dispersing medium, of at least one salt selected from the group consisting of aluminum sulphate, aluminum chloride, aluminum potassium sulfate, aluminum ammonium sulphate, ammonium sulphate, sodium sulphate, calcium chloride, chromium sulphate, ferrous sulphate, manganous sulphate, nickel chloride, magnesium sulphate, and tin sulphate.

2. Decorative coating composition as recited in claim 1 in which said organic film forming vehicle is selected from the group consisting of nitrocellulose lacquer, cellulose acetate lacquer, ethylcellulose lacquer, synthetic resin enamel, natural resin enamel, drying oil base paint, non-drying oil base paint, solutions of polyvinyl resins, alkyd resins, styrene resins, polyacrylic resins, urea-formaldehyde resins, and phenol-formaldehyde resins.

3. Decorative coating compositions as recited in claim 1 in which said organic colloidal stabilizer is methyl cellulose in an amount sufficient to prevent appreciable coalescence but insufficient to cause emulsification of said particle whereby relatively large particles of viscous coating materials are maintained in suspension.

4. Decorative coating composition as recited in claim 1 in which said aqueous dispersing medium contains dissolved therein at least 0.7% by weight of said salt.

5. Decorative coating composition as recited in claim 1 in which said discrete particles contain dispersed pigment and said salt stabilizes said coating composition against leaching of pigment from said particles into said aqueous medium.

6. A decorative coating composition stable in liquid form consisting essentially of a dispersion of discrete particles, a major portion of which have a diameter greater than 50 microns, of organic film forming vehicle containing dispersed pigment in an aqueous dispersing medium containing an organic colloidal stabilizer and having dissolved therein approximately 0.3% to about 12% by weight, based on the weight of the aqueous dispersing medium, of aluminum sulphate.

References Cited in the file of this patent
UNITED STATES PATENTS

| | | |
|---|---|---|
| 2,208,597 | Rafton | July 23, 1940 |
| 2,375,140 | Semon | May 1, 1945 |
| 2,473,929 | Wilson | June 21, 1949 |
| 2,591,904 | Zola | Apr. 8, 1952 |
| 2,658,002 | Schwefsky | Nov. 3, 1953 |
| 2,684,300 | Wilson et al. | July 20, 1954 |
| 2,872,315 | Watkins | Feb. 3, 1959 |